Sept. 28, 1965  R. H. DYER ETAL  3,209,118
WELDING APPARATUS

Filed Sept. 14, 1964  9 Sheets-Sheet 1

INVENTORS
Rex H. Dyer &
Lauren W. Burnett
BY
Fishburn & Gold
ATTORNEYS

INVENTORS
Rex H. Dyer &
Lauren W. Burnett
BY
Fishburn & Gold
ATTORNEYS

Sept. 28, 1965   R. H. DYER ETAL   3,209,118
WELDING APPARATUS

Filed Sept. 14, 1964   9 Sheets-Sheet 4

INVENTORS
Rex H. Dyer &
Lauren W. Burnett
BY
Fishburn & Gold
ATTORNEYS

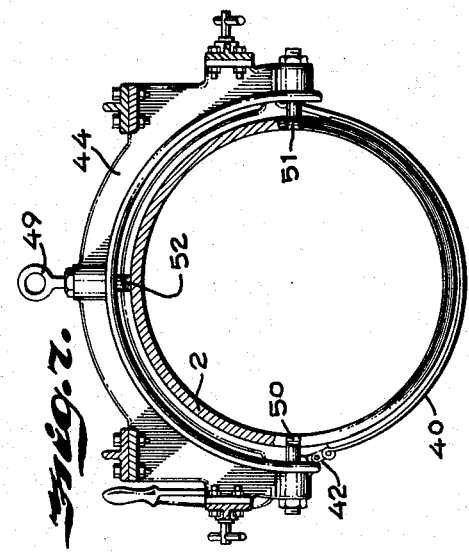
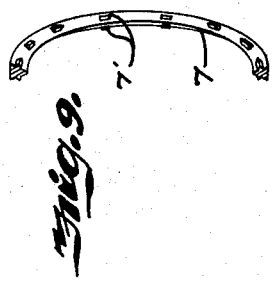
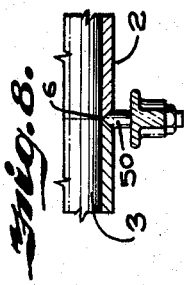
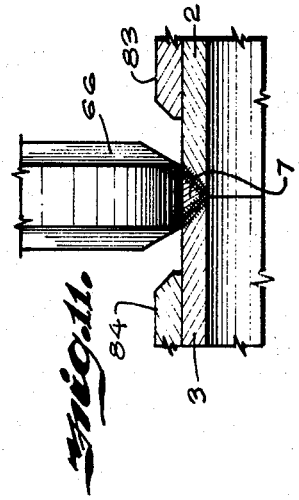
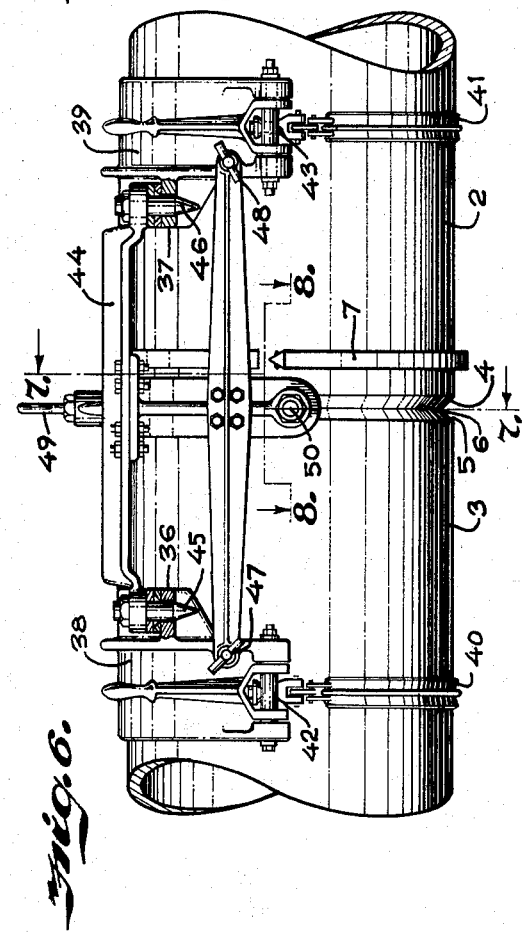
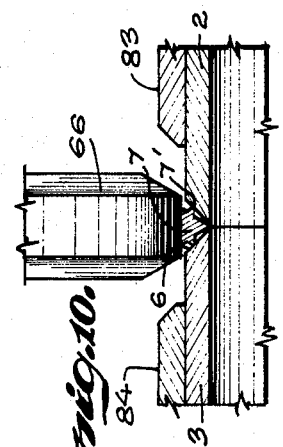
INVENTORS
Rex H. Dyer &
Lauren W. Burnett
BY
Fishburn and Gold
ATTORNEYS

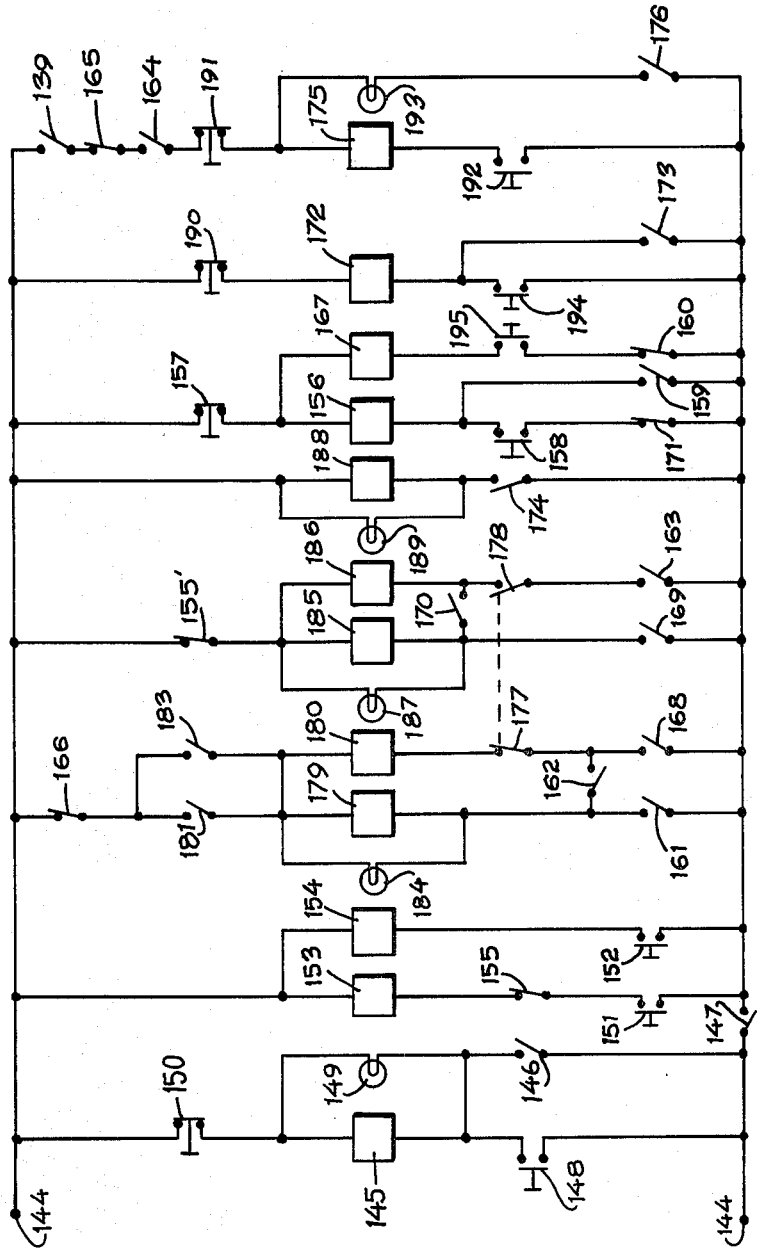

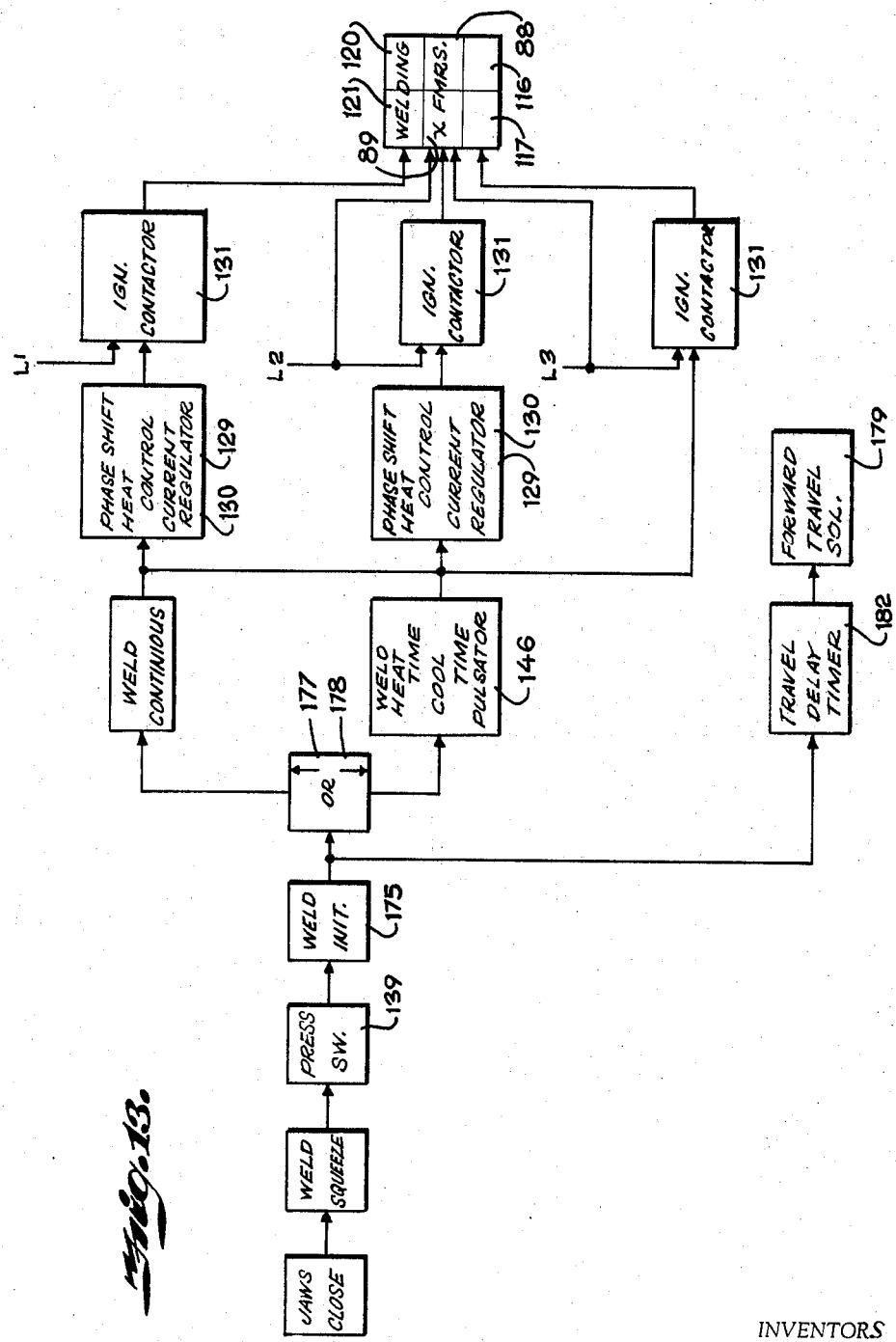

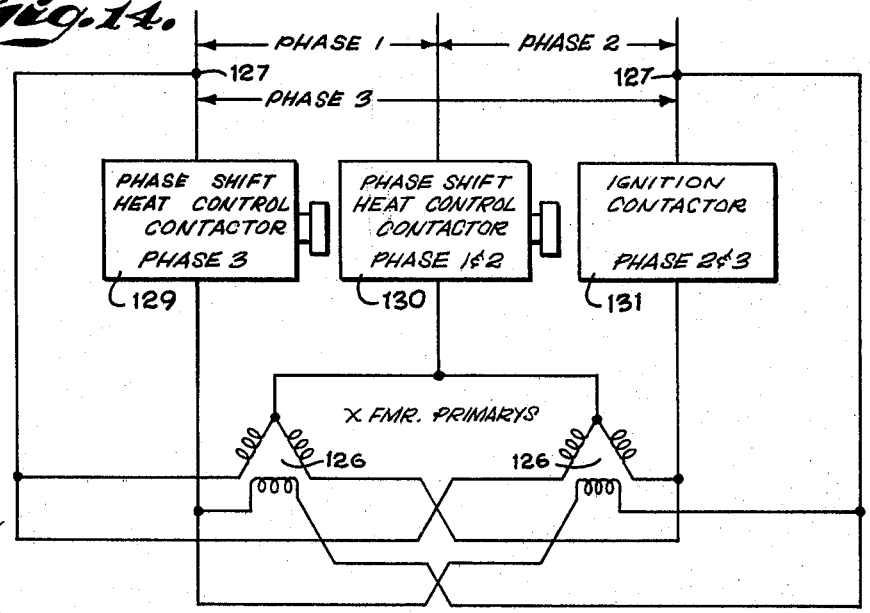
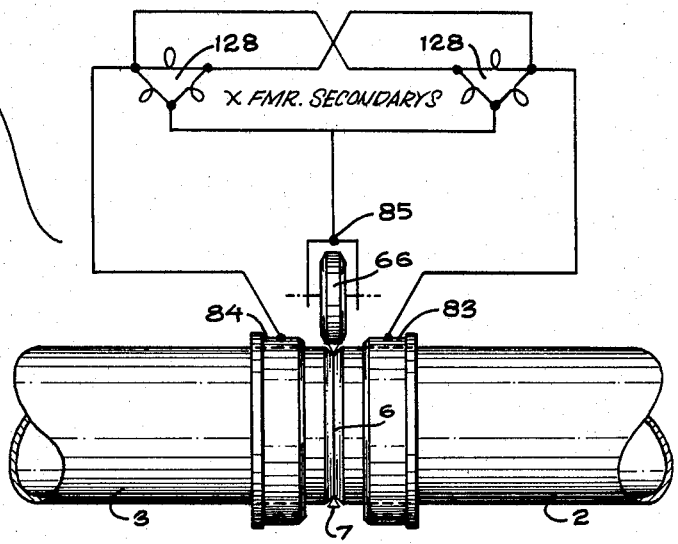
Fig. 14.
INVENTORS
Rex H. Dyer &
Lauren W. Burnett
BY
ATTORNEYS

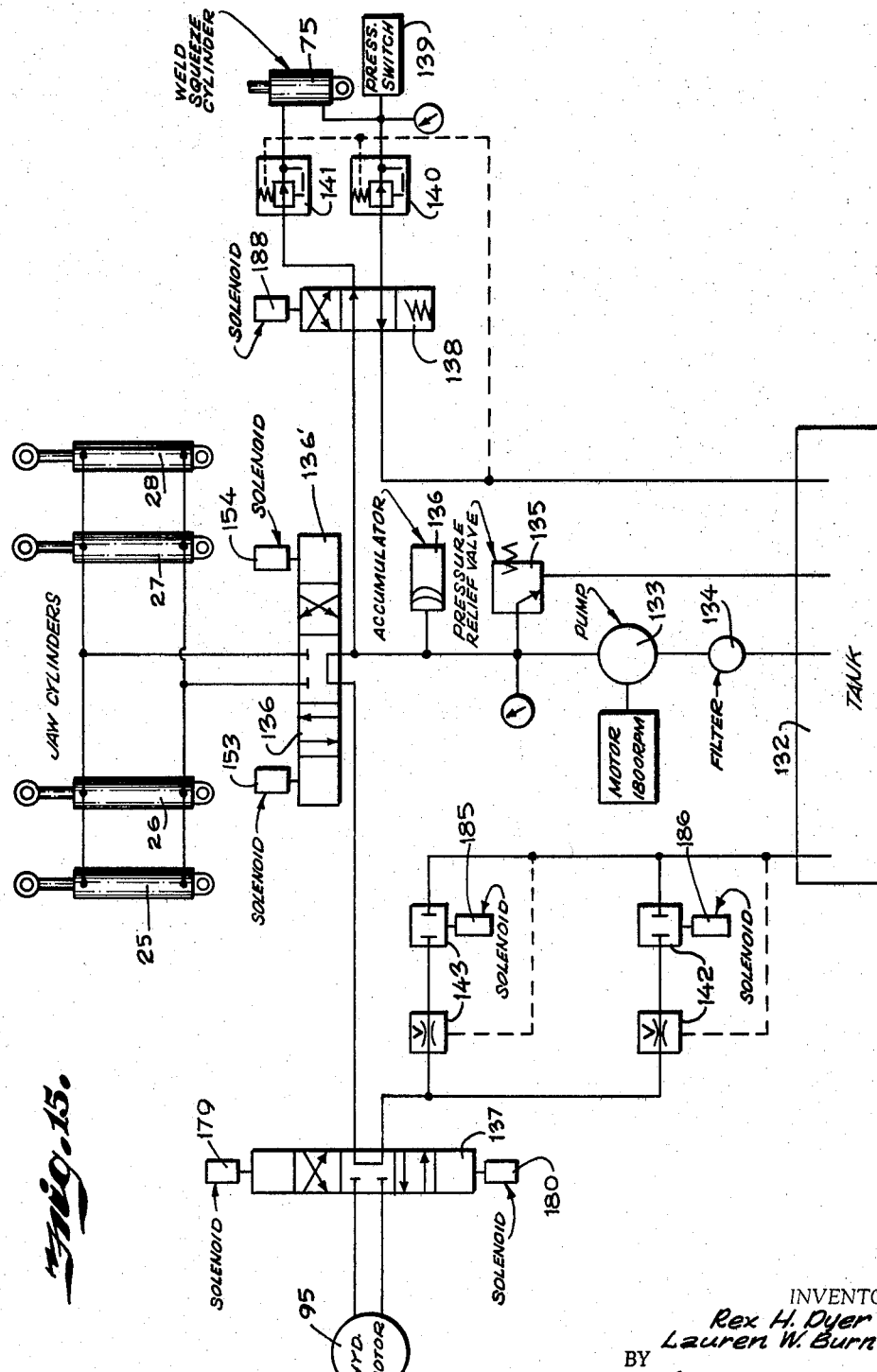

United States Patent Office 3,209,118
Patented Sept. 28, 1965

3,209,118
WELDING APPARATUS
Rex H. Dyer, 2717 Santa Fe Road, Independence, Mo., and Lauren W. Burnett, 4818 Campbell, Kansas City, Mo.
Filed Sept. 14, 1964, Ser. No. 396,290
12 Claims. (Cl. 219—60)

This invention relates to resistance type welders, and more particularly to portable electric welding apparatus for joining sections of cylindrical metal pipe together. This application is a continuation-in-part of United States patent application Serial No. 206,892, filed July 2, 1962.

The principal objects of the present invention are: to provide a portable automatic resistance type pipe line welder adapted to be easily transported to the site of pipe laying; to provide such an apparatus which is adapted to weld together the abutting circumferential edges of two pipe sections; to provide such an apparatus which comprises a pair of jaw members hinged together for quickly and easily receiving abutting pipe sections therebetween; to provide such a pipe line welder wherein a carrier having a welding roller supported thereon is orbited 360 degrees about the pipe sections along adjacent edges being welded together; to provide such an apparatus wherein the carrier cooperates with a pair of resiliently mounted "wobble" rings surrounding the pipe sections but greater in diameter than the sections, the rings being used to complete current flow circuits to the moving weld area; to provide such an apparatus which progressively welds sections of cylindrical pipe together along abutting circumferential beveled edges thereof which form an outwardly opening V-shaped groove with a pre-formed ring of welding wire therein; to provide such an apparatus which is adapted to tack weld the welding wire ring to the pipe sections on the first orbital pass to prevent welding wire creep on the welding pass; to provide such an apparatus which quickly resets to a starting condition upon completion of a weld to permit opening the jaw members; to provide such an apparatus which produces a superior seam consistently with a minimum of power and apparatus bulk; and to provide such a device which is simple in construction, easily handled in the field with suitable crane equipment, requires a minimum of skill to operate and which is rapid and reliable in use.

Other objects and advantages of this invention will become apparent from the following description taken in connection with the accompanying drawings wherein are set forth by way of illustration and example certain embodiments of this invention.

FIG. 6 is a fragmentary side elevation on the scale of FIG. 3 showing two abutting pipe sections with the locating device thereon and prior to removal of the spacer portion.

FIG. 7 is a vertical cross-sectional view taken on the line 7—7, FIG. 6, particularly showing the probes on the locating device spacer portion for insertion into the weld groove.

FIG. 8 is a fragmentary cross-sectional view taken on the line 8—8, FIG. 6, showing further details of a welding groove probe.

FIG. 9 is a perspective fragmentary view on a reduced scale showing a portion of a pre-formed welding ring adapted for use with this invention.

FIG. 10 is a cross-sectional fragmentary view through abutting pipe sections showing the welding roller urging the welding ring into the weld groove.

FIG. 11 is a cross-sectional fragmentary view similar to FIG. 10 but after the weld is formed.

FIG. 12 is a schematic wiring diagram illustrating an electrical control circuit for welding apparatus embodying this invention.

FIG. 13 is a schematic flow diagram illustrating the operational and control sequence of the welding apparatus.

FIG. 14 is a schematic wiring diagram of the welding transformers and their connection to the apparatus.

FIG. 15 is a schematic diagram of the apparatus hydraulic system.

Figure 1:
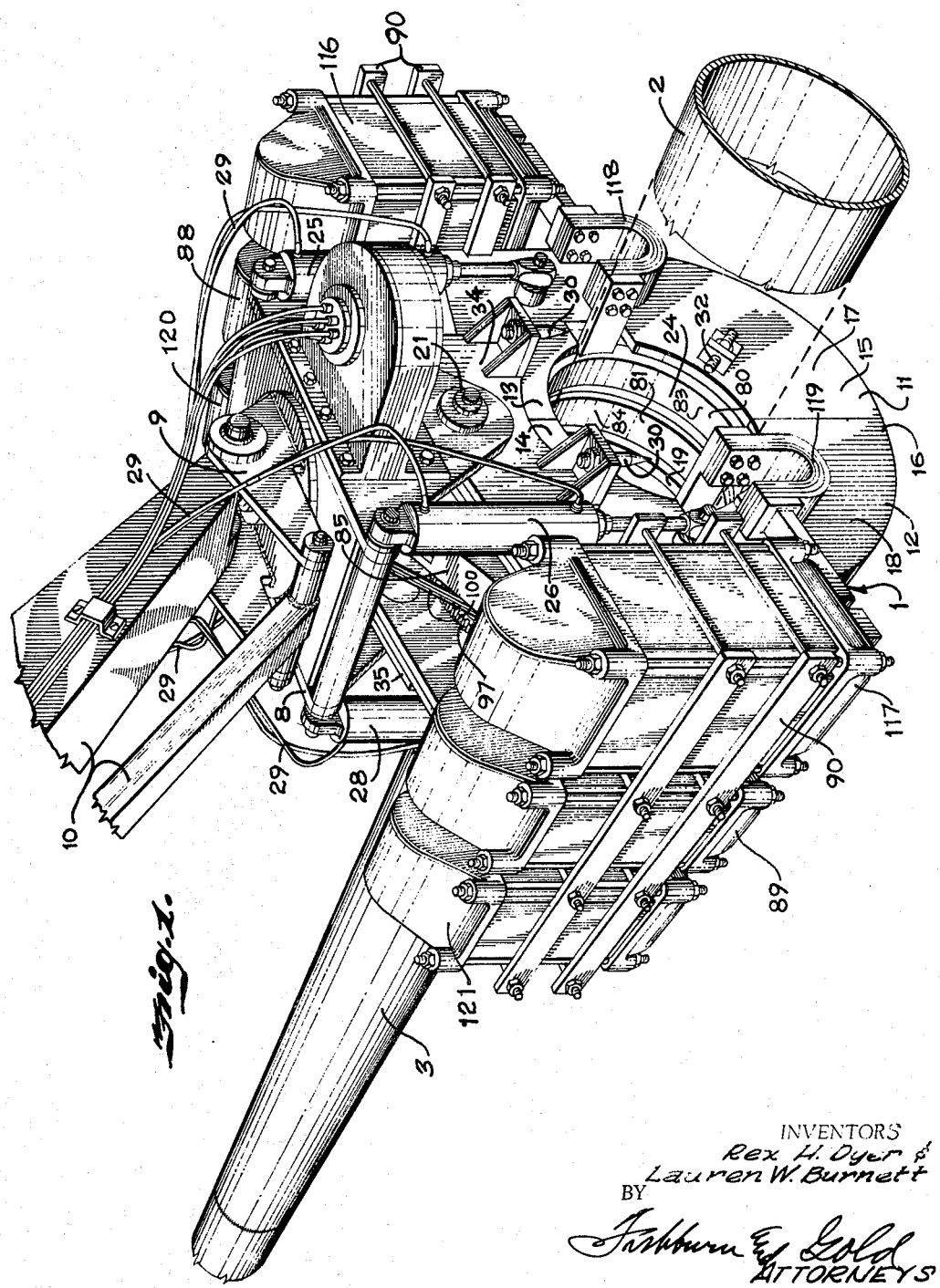
FIG. 1 is a perspective view with portions broken away showing apparatus embodying this invention supported by a crane arm and in closed condition about pipe sections.
Figure 2:
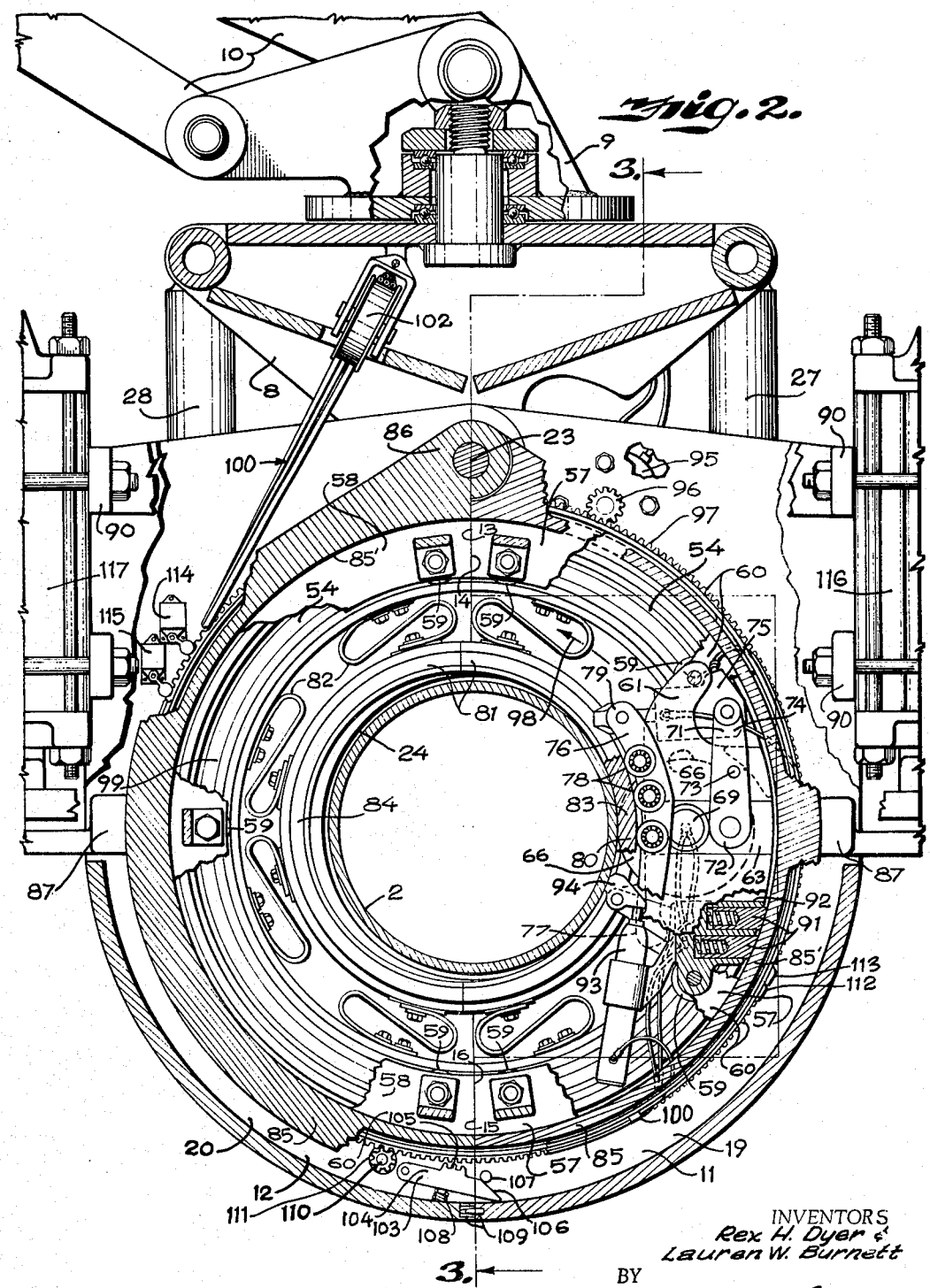
FIG. 2 is a vertical cross-sectional fragmentary view through the welding apparatus with parts broken away particularly showing the hinged jaw members and the welding roller carrier cooperating therewith.

Referring to the drawings in more detail:

The reference numeral 1 generally indicates apparatus embodying this invention for progressively welding sections 2 and 3 of cylindrical pipe together along abutting circumferential beveled edges 4 and 5 respectively. The pipe sections 2 and 3 may be of large size for high-pressure pipeline installation, for example 30 to 40 inches in inside diameter. The beveled edges 4 and 5, when abutted together, form an outwardly opening V-shaped circumferential groove 6 into which is placed a pre-formed ring 7 of welding wire. The ring 7 preferably has a cross-sectional periphery in the shape of a pie slice with a more acute angle than the groove 6 to reduce the possibility of air entrapment in the groove and to promote heating first at the root of the groove. The ring 7 also preferably has circumferentially spaced apart laterally extending projections 7' thereon to help support it in centered upright position in the groove 6, FIG. 10.

The apparatus 1 comprises a frame 8 having an upper swivel supporting structure 9 adapted to cooperate with suitable crane arms 10 for suspending the apparatus 1 adjacent the pipe sections. A pair of vertically disposed semi-circular ring jaw members designated 11 and 12 respectively have upper end portions 13 and 14 and lower end portions 15 and 16. The jaw members 11 and 12 each include a front plate 17 and 18 and a rear plate 19 and 20, the front and rear plates being horizontally spaced apart and vertically disposed substantially parallel to each other. Hinge structures 21 and 22 respectively pivotally connect said plates 17 and 18 and said plates 19 and 20 to each other and to the frame 8 on plates 17 and 18 and said plates 19 and 20 to each other and to the frame 8 on a common horizontal axis 23 and at the jaw member upper end portions 13 and 14. Jaw members 11 and 12 are thereby adapted to selectively abut or close at the upper end portions 13 and 14 and the lower end portions 15 and 16. The jaw members 11 and 12 have internal radii whereby when closed a horizontally extending cylindrical passageway 24 is formed therethrough for receiving said pipe sections. When opened, the jaw members are laterally spaced apart at the lower end portions 15 and 16 a distance sufficient to pass the pipe sections therebetween.

Figure 4:
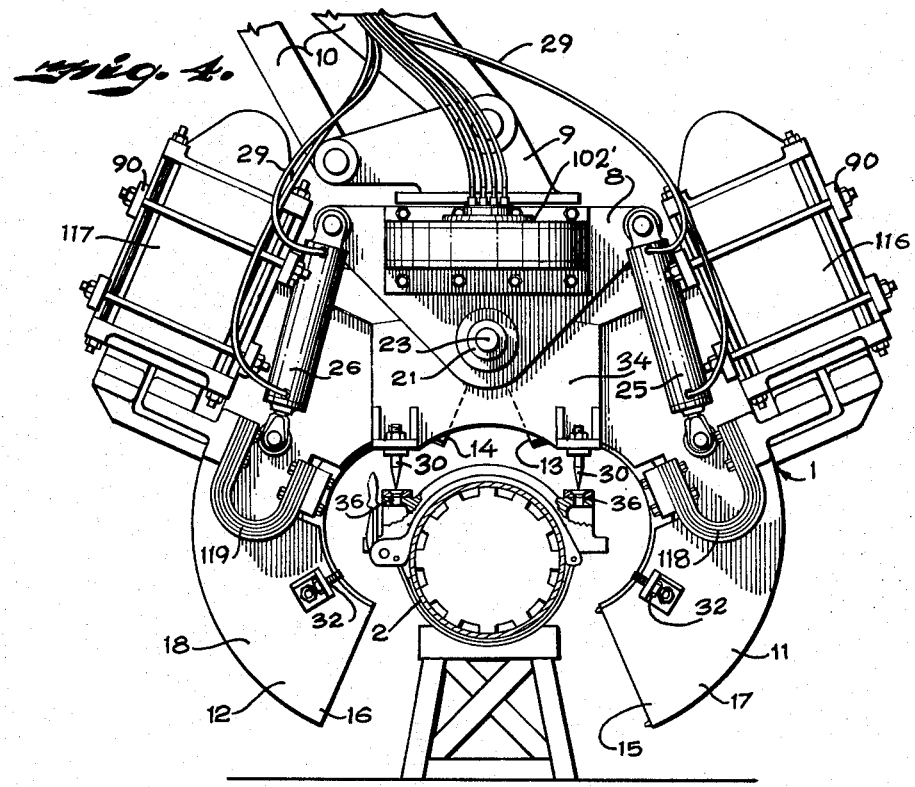
FIG. 4 is a front elevational view of the apparatus on a reduced scale particularly illustrating the jaw members in open condition for receiving pipe sections therebetween with a welding apparatus locating device on the pipe sections.
Figure 5:
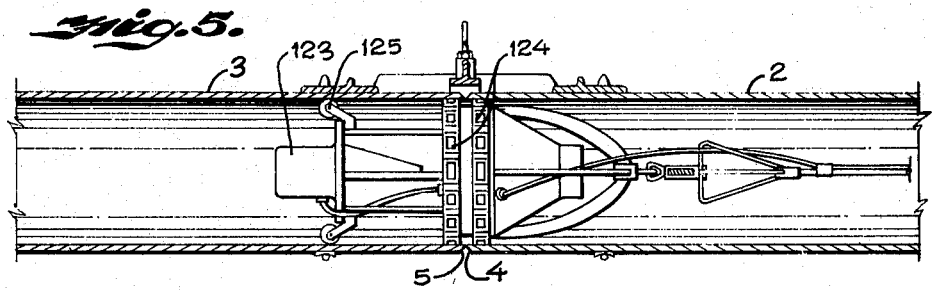
FIG. 5 is a longitudinal cross-sectional view on a reduced scale through a pair of abutting pipe sections showing the locating device and a typical internal remote controlled clamp for maintaining the pipe sections in abutting alignment.

Front hydraulic cylinders 25 and 26 respectively are connected between the frame 8 and the front plates 17 and 18 and rear hydraulic cylinders 27 and 28 are connected between the frame 8 and the rear plates 19 and 20. The cylinders 25 to 28 are connected to suitable hydraulic lines 29 for selectively pivoting the jaw members 11 and 12 away from each other as best illustrated in FIG. 4 to provide access into the cylindrical passageway 24, and subsequently closing same around the pipe sections 2 and 3, FIG. 1.

The cylindrical passageway 24 formed between the jaw members 11 and 12 is larger in diameter than the outside diameter of the pipe sections 2 and 3. In order to maintain the apparatus 1 in a fixed desired relationship with respect to the beveled edges 4 and 5 of the pipe sections to be welded together, front spaced apart locating pins 30, rear spaced apart locating pins 31, front pipe section contacting screws 32 and rear pipe section contacting screws 33 are provided. The locating pins 30 and 31 are respectively fixed to front and rear depending plates 34 and 35 which are secured to the frame 8 and remain stationary when the jaw members 11 and 12 are pivoting with respect to the frame 8. The pipe contacting screws 32 and 33, however, are fixed respectively to the front plates 17 and 18 and rear plates 19 and 20 and hence move outwardly with the pivotal separation of the lower end portions 15 and 16 to receive the pipe sections between the jaw members.

The locating pins 30 and 31 are receivable in sockets respectively designated 36 and 37 formed on brackets 38 and 39 which are previously secured in spaced apart relation on opposite sides of the groove 6 by means of straps 40 and 41 securely tightened in place by means of lever operated buckles 42 and 43. A spacer member 44 has pins 45 and 46 near opposite ends thereof which are adapted to be received into the respective sockets 36 and 37. The spacer member 44 is adapted to be temporarily secured to the respective brackets 38 and 39 through screw fasteners 47 and 48 whereby the brackets and the spacer members become a unitary device which can be lifted and carried by means of a suitable central support ring 49.

The spacer member 44 includes inwardly projecting opposed probes 50 and 51 which are wedge shaped at the inner ends thereof for being received in the groove 6 formed between the abutting pipe sections 2 and 3. The probes 50 and 51 are spaced apart the diameter of the groove 6 at the apex or smallest dimension thereof. The spacer member 44 is generally semi-circular in shape and of such dimension that when a top block portion 52 thereof rests on the pipe sections, the probes 50 and 51 are located approximately on the elevation of the pipe axis. Thus, when the spacer member 44 is placed on the pipe sections with the probes 50 and 51 in the groove 6, the brackets 38 and 39 become located in an exact predetermined position with respect to the groove 6. Upon tightening the straps 40 and 41 the brackets 38 and 39 are secured in position and the spacer member 44 may be removed by withdrawing same upwardly after the screw fastener 47 and 48 are disengaged from the brackets 38 and 39. The sockets 36 and 37 are thus positioned in the desired location for receiving the pins 30 and 31 described above for positioning the apparatus with respect to the welding groove 6.

It is noted that the welding ring 7 is slipped over a beveled edge on one of the pipe sections and remains adjacent the probes 50 and 51 but not in the groove 6 when the brackets 38 and 39 are being located by the spacer member 44. After the spacer member 44 is removed and before the welding apparatus 1 is lowered over the pipe sections 2 and 3, the welding ring 7 is urged into the groove 6 where, due to the pre-formed condition thereof, it springs or snaps tightly thereinto.

The front and rear pipe section contacting screws 32 and 33 are adjusted so that upon closing the jaw members 11 and 12 the contacting screws bear against the respective pipe sections to prevent unwanted relative motion between the welding apparatus and the pipe sections during the welding steps described hereinafter.

Two pairs 53 and 54 of semi-circular separable guide members are respectively secured to the inner surfaces of the front plates 17 and 18 and the inner surfaces of the rear plates 19 and 20. The respective pairs are adapted to abut when the jaw members 11 and 12 are closed to form closed circles to transversely surround the pipe sections on opposite sides of the groove 6. The pairs 53 and 54 of guide members form opposed, spaced apart front and rear track circular guide grooves 55 and 56 extending coaxially continuously about the cylindrical passageway 24 but on a larger diameter. The pairs 53 and 54 of guide members are separable at the jaw member upper end portions 13 and 14 and the lower end portions 15 and 16 to permit pivoting of the jaws 11 and 12 as noted above.

First and second semi-circular ring gear sections 57 and 58 have suitable circumferentially spaced and opposed bearings or wheels 59 rotatably mounted thereon and supported in the guide grooves 55 and 56. The sections 57 and 58 abut when the jaw members 11 and 12 are closed to form a circular ring gear cage 60 for surrounding and rotating about the pipe sections. Secured to the first ring gear section 57 is a carrier 61 movable with the cage 60 in an orbital path about the cylindrical passageway 24. Spaced slidable bearing blocks 62 and 63 respectively are supported in the carrier 61 in suitable guide slots 64 and 65 for radial movement toward and away from the cylindrical passageway 24. A welding roller 66 is rotatably supported on the bearing blocks 62 and 63 for radial movement therewith. The welding roller 66, in the illustrated example, has suitable passageways therein (not shown) and hoses 67 and 68 suitable communicating therewith through a mounting shaft 69 and rotating coupler 70 for circulating coolant through the roller interior.

Figure 3:
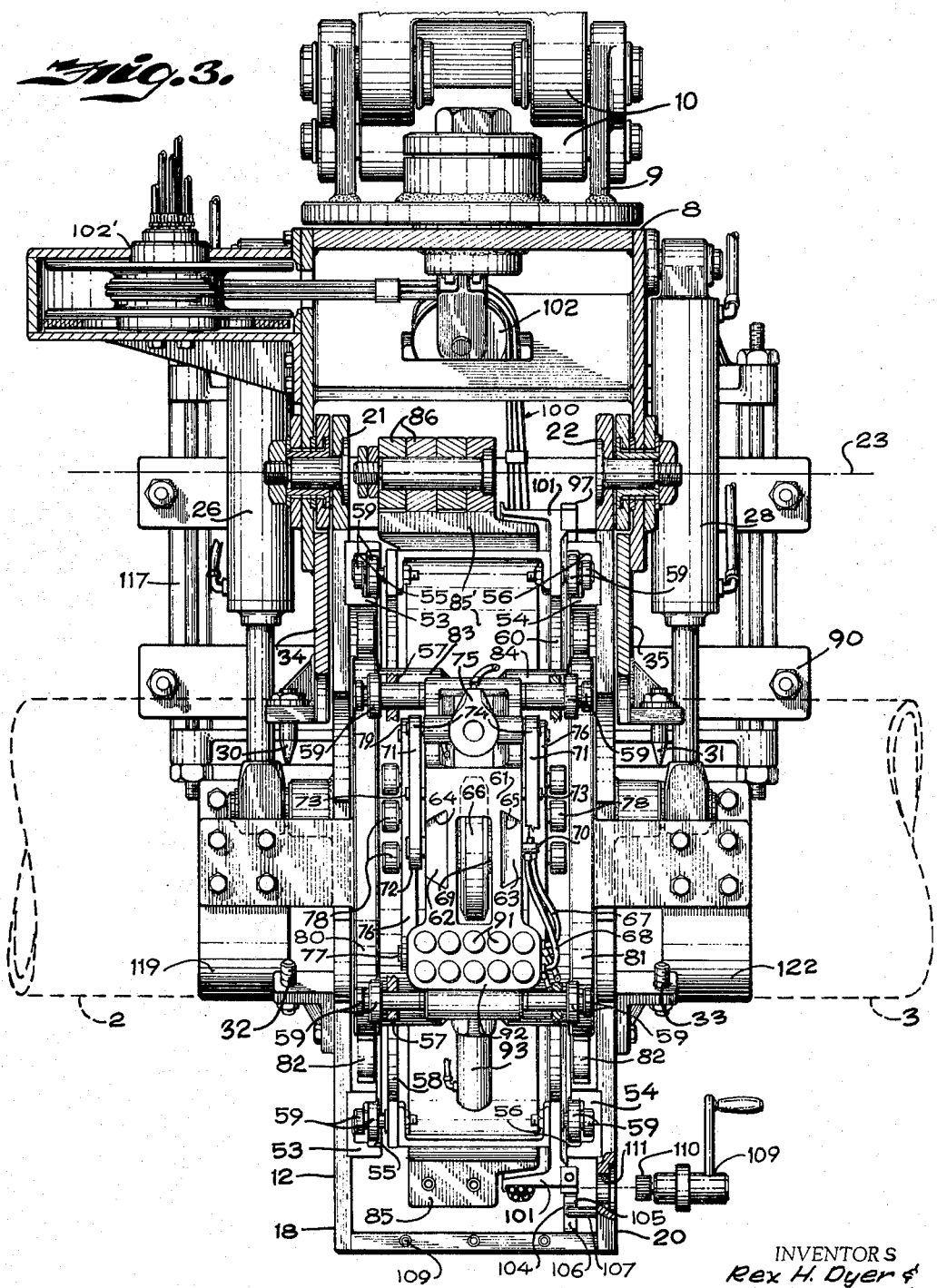
FIG. 3 is a vertical cross-sectional view through the welding apparatus taken on the line 3—3, FIG. 2, particularly showing further details of the jaw members and welding roller carrier.

Spaced apart parallel levers 71 are pivotally mounted at rear ends 72 thereof to the bearing blades 62 and 63 and at intermediate portions 73 thereof to the carrier 61. The front ends 74 of the levers 71 are pivotally mounted on one end of an hydraulic cylinder 75. Spaced apart parallel levers 76 are pivotally mounted at rear ends 77 thereof to the carrier 61 nearer the cylindrical passageway 24 than the levers 71. Cam roller bearings 78 are engaged in the levers 76 and extend outwardly thereof, FIG. 3. The cam roller bearings 78 provide means for transmitting force to electrical contact members or wobble rings described below. The front ends 79 of the levers 76 are pivotally mounted to the other end of the hydraulic cylinder 75.

Two pairs 80 and 81 of semi-circular contact wobble ring sections are respectively resiliently mounted on the guide members 53 and 54 by means of springs 82. The pairs 80 and 81 of wobble ring sections are located on opposite sides of the circumferential edges 4 and 5 when the pipe sections are in the passageway 24. The pairs 80 and 81 respectively align to form circular contact wobble rings 83 and 84 surrounding the passageway 24 when the jaw members 11 and 12 are closed and have inside diameters greater than the outside diameter of the pipe sections 2 and 3. The cam roller bearings 78 are urged against the wobble rings 83 and 84 when the hydraulic cylinder 75 is extended which causes the wobble rings to maintain electrical contact with the pipe sections progressively in the area adjacent the welding roller 66. The extension of the hydraulic cylinder 75 simultaneously pivots the levers 71 about the intermediate portions 73 urging the welding roller radially inwardly into contact with the welding ring 7 in the groove 6.

A pair of semi-circular slip ring sections 85 have upper ends 86 pivotally engaged together on the axis 23 and are respectively located within the jaw members 11 and 12 and are moveable therewith by virtue of connecting buss members 87 secured to transformers 88 and 89 which are mounted on the jaw members 11 and 12 by mounting structure 90. When closed, the sections 85 form a slip ring 85' with a diameter greater than the cage 60. Current-transmitting spring-loaded brushes 91 are supported in a suitable retainer 92 forming part of the carrier 61. The brushes 91 are electrically common with the welding roller 66 through the bearing blocks 62 and 63 and are adapted to maintain sliding contact with the slip ring 85' during the orbiting of the carrier 61 as described more fully hereinafter.

A reciprocating hammer assembly 93, preferably air driven is mounted on the carrier 61 between the wobble rings 83 and 84 and has a striking member 94. The striking member 94 is periodically reciprocated to provide an inwardly radially directed blow to the welding ring 7 immediately after fusion to relieve stresses and aid in producing weld integrity.

A cage drive member, in the illustrated example a hydraulic motor 95, has a pinion 96 engaged with the ring gear portion 97 of the cage 60 for orbiting the carrier 61 about the cylindrical passageway 24. The motor 95 is reversible so the carrier 61 may be driven counter-clockwise as indicated by the arrow 98 for tacking or welding and in the opposite direction for returning to a rest or jaw member opening position at 99. Air and hydraulic lines generally designated 100 for feeding the cylinder 75, hammer assembly 93 and coolant hoses 67 and 68 are wrapped on a sheave 101 fixed to the cage 60. The lines 100, during motion of the cage 60, are fed over an idler pulley 102 to or from a spring loaded rotary base storage and coupling member 102' of a type which is commercially available.

When the jaw members 11 and 12 are opened, as shown in FIG. 4, the ring gear cage section 57 is located within the jaw member 12 and the section 58 is in the jaw member 11. The section 58 is then prevented from rotating out of the jaw member 11 due to the braking of the drive motor 95, but other provisions must be made to retain the section 57. A latch mechanism 103 includes an arm 104 having gear teeth 105 adapted to engage the ring gear portion 97. The arm 104 also has a cam surface 106 which engages a pin 107 when the jaw members are closed to disengage the gear teeth 105 and permit the cage 60 to rotate. When the jaw members are opened, however, a spring 108 urges the gear teeth 105 into engagement to prevent the section 57 from rolling out of the jaw member 12. Suitable alignment pins and sockets 109 insure proper alignment of the jaw members when closed. A crank 109' has a pinion 110 thereon which is adapted to be inserted in an access opening 111 for engaging the ring gear portion 97 for manual manipulation when desired. Of course, the latch mechanism 103 must be disengaged before the crank 109' can be used.

The cage 60 has cams 112 and 113 associated with the carrier 61 and respectively adapted to contact limit switches 114 and 115 as the cage 60 is rotated in opposite directions.

Transformers 116 and 117 are supported by the mounting structure 90 for movement with the jaw members and are respectively electrically connected by flexible buss members 118 and 119 to the wobble ring 83. Transformers 120 and 121 are likewise supported by the mounting structure 90 and are connected to the wobble ring 84 by flexible buss members 122.

An internal mandrel 123 which may be of the type Model "D-J" air clamp manufactured by Crutcher-Rolfs-Cummings, Inc., Houston, Texas, comprises a plurality of segments 124 which are maintained in contact with the pipe sections to align and draw same together by remote control. The mandrel 123 also provides back-up support during welding and is adapted for insertion into one of the cylindrical pipe sections, in the illustrated example the section 2 and rolls into place on rollers 125.

Referring particularly to FIG. 14, the transformers 88, 89, 116, 117, 120 and 121 are preferably of the intermittent duty, circulating liquid-cooled type. Each has suitable three-phase interconnected primary windings designated 126 connected to a source of electrical energy 127, for example 220 volts, 300 cycles A.C. Each of the primary windings 126 has associated therewith a secondary winding 128. The secondary windings 128 are suitably interconnected in three phase relation and the group is connected across the slip ring sections 85 and the wobble rings 83 and 84. The secondary windings 128 are composed of very few turns of heavy wire or bar for transmitting very high current flow at relatively low voltage. Suitable on-off and current flow controls 129, 130 and 131 are provided to control the welding conditions.

Referring particularly to FIG. 15, a suitable hydraulic circuit for the apparatus is depicted and includes a hydraulic fluid supply tank 132 feeding a pump 133 through a filter 134. The pump supplies the fluid to the system continuously and excess fluid returns to the tank through a pressure relief valve 135, maintaining substantially constant pressure in the system. An accumulator 136 reduces shock loading in the system. Suitable conventional solenoid controlled reversible flow hydraulic valves 136', 137 and 138 respectively control hydraulic fluid flow to the jaw cylinders 25–28, the cage drive hydraulic motor 95, and the weld squeeze hydraulic cylinder 75. Also provided is a pressure switch 139 included in the electrical circuit described below to prevent a welding pass unless weld squeeze pressure is applied to the cylinder 75. Reducing valves 140 and 141 control the pressure of the closing and opening strokes of the cylinder 75. Solenoid operated variable flow control valves 142 and 143 are provided for controlling the forward speed of the carrier 61 respectively during tacking and during welding. Both valves are opened during a return traverse of the carrier to obtain maximum speed.

Referring particularly to FIG. 12, an electrical circuit is schematically depicted for controlling the welding apparatus. The circuit includes relay and manual switches for actuating hydraulic control solenoids and power controls. A source of control current is provided at 144. A power control relay 145 closes switches 146 and 147 upon closing momentary on switch 148. The condition of the relay 145 is shown by pilot 149. Momentary off switch 150 breaks the holding circuit to the relay 145. Pushbutton switches 151 and 152 control solenoids 153 and 154 for controlling the jaw members. Switch contacts 155 and 155' are opened by the limit switch 114 for reverse stop control. Control relay 156 receives power through normally closed pushbutton switch 157 and normally open pushbutton switch 158. Switch 157 is to stop forward or reverse movement of the carriage and switch 158 is to start forward movement of the carriage. Relay 156 controls normally open holding switch 159, normally closed switch 160, normally open switches 161 and 162, and normally open switches 163 and 164. Switch contacts 165 and 166 are opened upon operation of the forward stop limit switch 115.

Control relay 167 actuates switches 168, 169, 170 and 171. Control relay 172 actuates switches 173 and 174. Control relay 175 actuates switch 176. Manual switches 177 and 178 control the forward speed of the carriage to either tacking or welding speed. Solenoids 179 and 180 control forward and reverse flow of the hydraulic valve 137. Switch 181 in a time delay control 182, FIG. 13, which prevents the carriage from moving until the proper heating time has elapsed. Switch 183 is an override switch which prevents the timer 182 from being in the circuit when servicing the apparatus. A pilot 184 monitors the condition of solenoids 179 and 180.

Solenoids 185 and 186 control the forward and reverse speed of the carriage through valves 142 and 143. A pilot 187 monitors solenoids 185 and 186. Solenoid 188 controls the weld squeeze cylinder 75 through the valve 138 and a pilot 189 monitors the solenoid 188. Pushbutton switches 190 and 191 respectively provide a stop control for raising the weld roller and breaking the circuit providing welding current. The pushbutton switch 192 starts welding current which is monitored by the pilot 193. Pushbutton switches 195 and 195' respectively lower the welding roller and starts forward movement of the carriage.

By way of operation and with particular reference to FIG. 13, the apparatus 1 is carried on a crane or tractor boom or the like to the place where the pipe sections are to be welded together. The pipe sections are cleaned and the pre-formed welding wire ring 7 is placed over one edge as in FIG. 6. The sections are drawn together and aligned by the internal mandrel 123 and the spacer member 44 is used as described above to locate the sockets 36 and 37. The welding ring 7 is placed in the groove 6. The jaw members 36 and 37 are then pivoted away from each other and the apparatus lowered over the sections with the pins 30 and 31 being received in the sockets 36 and 37. The jaw members are then closed and the pushbutton controls noted above manipulated to squeeze the welding roller against the welding ring 7 and begin current flow between the welding roller and the wobble rings. Travel of the carriage is delayed by the timer 182 until the weld area is sufficiently heated and then travel of the carriage in the direction 98 begins. If desired the speed can be high and the current interrupted by a pulsator 146 to form a tack weld by manipulation of the switches 177 and 178. When the carriage has traveled a full circle the limit switch 115 is contacted which opens contacts 165 stopping the welding and the carriage travel and reversing the carriage travel until the beginning position is assumed. A welding pass may then be made at lower speed and the carriage again returned to the beginning position. During welding passes the hammer assembly 93 is operated to relieve stresses. The jaw members 11 and 12 are then opened and the apparatus is removed from the pipe sections for transporting to a place where another weld is required.

It is to be understood that while one form of this invention has been illustrated and described, it is not to be limited to the specific form or arrangement of parts herein described and shown except insofar as such limitations are included in the claims. For example, it will occur to those skilled in the art that the apparatus and method herein disclosed may be suitably modified to provide a progressing weld area inside the pipe sections with the contact area progressing adjacent to the weld area either inside or outside the pipe sections, that various forms of welding material may be used and need not be initially separable from both pipe sections and the pipe section end edges may slant with respect to the section axes to form closed curved paths other than circular.

What we claim and desire to secure by Letters Patent is:

1. Apparatus for welding two sections of metal pipe together along adjacent curved end edges in contact with welding material comprising:
    (a) a supporting frame, a pair of jaw members supported on said frame, at least one of said jaw members being hinged with respect to said frame, means connected between said frame and said one jaw member for selectively pivoting said one jaw member to positions adjacent and away from the other jaw members, said jaw members when adjacent forming a passageway for receiving said pipe sections,
    (b) curved guide means carried by said respective jaw members and aligned when said jaw members are adjacent to surround said pipe sections in said passageway, curved ring sections having bearings engaged in said guide means, said ring sections abutting to form a ring member for surrounding said pipe sections when said jaw members are adjacent, said ring member being adapted for rotation about said pipe sections guided by said guide means,
    (c) a carrier fixed to one of said ring sections, a driving member associated with one of said jaw members and having means engaged with said ring member for driving said carrier in a curved path about said pipe sections, at least one electrical contact member associated with at least one of said jaw members for contacting at least one of said pipe sections,
    (d) said carrier having a welding member thereon for progressively contacting said welding material when said carrier is driven, and
    (e) electric current producing means electrically communicating with said welding member and said electrical contact member to cause current flow through said welding material for producing a curved path progressing weld along said pipe section edges as said carrier is driven.

2. Apparatus as set forth in claim 1 wherein:
    (a) said jaw members are each vertically disposed semi-circular ring sections having lower end portions which separate when said one jaw member is pivoted away from the other jaw member.

3. Apparatus as set forth in claim 1 wherein:
    (a) said means connected between said frame and said one jaw member for pivoting said one jaw member is an extensible force producing member.

4. Apparatus as set forth in claim 1 wherein:
    (a) said curved ring sections are semi-circular ring gear sections which form a circular ring gear member when said jaw members are adjacent, and
    (b) said driving member means is a drive pinion engaged with said ring gear member.

5. Apparatus as set forth in claim 1 wherein:
    (a) said electrical contact member is a pair of contact wobble ring sections respectively resiliently mounted on said jaw members,
    (b) said wobble ring sections being aligned to form a circular contact wobble ring surrounding said passageway when said jaw members are adjacent and having an inside diameter greater than the outside diameter of said pipe sections,
    (c) said carrier having means associated therewith to urge said wobble ring into moving contact with said one pipe section adjacent said carrier welding member.

6. Apparatus as set forth in claim 1 including:
    (a) current transmitting brushes supported by said carrier and electrically communicating with said welding member,
    (b) slip ring sections associated with said jaw members for forming a slip ring closable about said pipe sections with said jaw members, and
    (c) means for maintaining said brushes in sliding electrical contact with said slip ring as said carrier is driven, said electric current producing means being electrically connected to said welding member through said slip ring and brushes.

7. Apparatus as set forth in claim 1 wherein said electric current producing means are transformers respectively mounted on said jaw members.

8. Apparatus as set forth in claim 4 including a latch mechanism mounted on one of said jaw members and having teeth adapted to engage the ring gear sections therein upon separating said jaw members to prevent the last-named ring gear section from moving relative to the last-named jaw member upon separating said jaw members.

9. Apparatus for welding two sections of cylindrical metal pipe together along adjacent circumferential edges in contact with welding material comprising:
    (a) a frame, a pair of vertically disposed semi-circular ring jaw members having upper and lower end portions, hinge structure connecting said jaw members to said frame at respective upper end portions thereof, extensible force producing members connected between said frame and said jaw members for selectively pivotally opening said jaw members laterally away from each other and closing said jaw members into upper and lower end portion abutting relation, said jaw members having internal radii whereby when closed a horizontally extending cylindrical passageway is formed for receiving said pipe sections and when opened said jaw members are spaced apart at said lower end portions a distance sufficient to pass said pipe sections between said lower portions, semi-circular guide means carried by said respective jaw members and aligned when said jaw members are closed to surround said pipe sections in said passageway, (b) a pair of semi-circular ring gear sections having bearings engaged in said guide means, said ring gear sections abutting to form a circular ring gear cage for surrounding said pipe sections when said jaw members are closed, said ring gear cage being adapted for rotation about said pipe sections guided by said guide means, (c) a pair of said semi-circular slip ring sections respectively mounted adjacent said jaw members and movable therewith to selectively form a slip ring closable to surround said pipe sections and separable to permit passage of said pipe sections thereinto, (d) a carrier fixed to one of said ring gear sections, a driving member associated with one of said jaw members and having a drive pinion engaged with said ring gear cage when said jaw members are closed for driving said carrier in a circular path about said pipe sections, (e) two pairs of semi-circular contact wobble ring sections respectively resiliently mounted adjacent said jaw members and located on opposite sides of said circumferential edges when said pipe sections are in said passageway, said wobble ring sections being aligned to form a pair of circular contact wobble rings surrounding said passageway when said jaw members are closed and having an inside diameter greater than the outside diameter of said pipe sections, (f) said carrier having means adapted to contact said wobble rings for urging same progressively into electrical contact with said pipe sections adjacent said carrier as said carrier is driven in said path, current transmitting brushes supported by said carrier in electrical sliding contact with said slip rings, a welding roller electrically communicating with said brushes and journaled on said carrier for movement therewith in a circular path adjacent said pipe edges, means associated with said carrier and adapted to cooperate with said first named carrier means for urging said welding roller into rolling electrical contact with said welding material when said wobble rings are urged into electrical contact with said pipe sections, and (g) electric current producing means electrically communicating with said slip ring and said wobble rings to cause current flow through said welding material and pipe sections for producing a circular path progressing weld along said pipe section edges.

10. Apparatus for welding metal pipe sections together along adjacent abutting end edges thereof in contact with welding material comprising:

(a) circular structural means adapted for fixed engagement with at least one of said pipe sections and having circular guide means for positioning in a closed curved path spaced from said end edges, a welding member movably engaged with said guide means, means coacting between said structural means and said welding member for urging said welding member into movable electrical contact with said welding material to form a weld area, (b) electrical contact means movably supported on said structural means, means coacting between said structural means and said contact means for urging said contact means into movable electrical contact with at least one of said sections adjacent said weld area to form a contact area, (c) means for impressing electrical energy between said welding member and said contact means for heating said welding material, and (d) drive means operable with said first and second named urging means and said energy impressing means, said drive means coacting between said structural means and said welding member and said electrical contact means for simultaneously moving said welding member and contact means with respect to said pipe sections so as to cause said weld area and contact area to progress adjacent each other in a closed curved path defined by said end edges for welding said end edges together.

11. The apparatus as set forth in claim 10 wherein:

(a) said electrical contact means is a circular contact member movable transversely of said pipe sections but restrained from substantial rotation with respect to said pipe sections.

12. The method of welding metal pipe sections together along adjacent end edges thereof in contact with welding material comprising:

(a) positioning said sections in aligned abutting relation in contact with said welding material, (b) urging a welding member into electrical contact with said welding material to form a weld area, (c) urging a circular electrical contact member into contact with at least one of said sections adjacent said weld area to form a contact area, (d) impressing electrical energy between said welding member and said contact member for heating said welding material, and (e) moving said welding member along said welding material and simultaneously moving said contact member with respect to said pipe sections to cause said weld area and contact area to progress adjacent each other in a closed curved path defined by said end edges, said movement of said contact member being substantially transversely of said pipe sections with substantially no rotation with respect to said sections.

References Cited by the Examiner

UNITED STATES PATENTS

| | | | |
|---|---|---|---|
| 686,558 | 11/01 | Thomson | 219—106 X |
| 2,265,943 | 12/41 | Laig | 219—106 |

RICHARD M. WOOD, *Primary Examiner.*

JOSEPH V. TRUHE, Sr., *Examiner.*